UNITED STATES PATENT OFFICE.

CARLETON ELLIS, OF MONTCLAIR, NEW JERSEY, ASSIGNOR TO CHADELOID CHEMICAL COMPANY, A CORPORATION OF WEST VIRGINIA.

PAINT AND VARNISH REMOVER.

1,406,175. Specification of Letters Patent. Patented Feb. 14, 1922.

No Drawing. Application filed December 31, 1920. Serial No. 434,396.

*To all whom it may concern:*

Be it known that I, CARLETON ELLIS, a citizen of the United States, and a resident of Montclair, in the county of Essex and State of New Jersey, have invented certain new and useful Improvements in Paint and Varnish Removers, of which the following is a specification.

This invention relates to a paint and varnish remover or finish removing composition and relates especially to composition containing solvents of the nature of the hydronaphthalenes, cyclohexanol and the like.

The hydronaphthalenes and especially the tetra compound are good solvents for many of the resins. Tetrahydronaphthalene dissolves most of the copals quite readily. It does not however readily dissolve many of the spirit soluble resins. An object of the present invention is to produce a composite solvent mixture containing a hydronaphthalene or similar solvent with other solvents which are capable of dissolving spirit soluble resins and thus furnish a removing composition which is capable of being applied to all purposes such as the removal of oil varnishes, shellac coatings and the like. It is also an object to maintain the flashpoint of the composition at as high a point as possible in order to not have a dangerously inflammable product.

A composition may be prepared employing with the hydronaphthalene cyclohexanol, benzyl alcohol, chlorhydrin such as that made from glycerin or chlorhydrins obtained by the treatment of ethylene or propylene with hypochlorous acid. In order to reduce evaporation to a minimum and to thus prevent loss of effective solvent material as well as to minimize the danger of forming a mixture of vapors and air of an inflammable or explosive nature an evaporation retardant, preferably a waxy body, is employed. A mineral wax such as paraffin or ceresin is preferred and ordinarily only 2 or 3% of wax by weight is necessary but the consistency of the mixture may be increased by adding several per cent additional wax. In some cases a thickening agent such as nitrocellulose or soap may be introduced.

Suitable compositions are made (Example 1) tetrahydronaphthalene and benzyl alcohol equal parts or, (Example 2) tetrahydronaphthalene 2 parts and cyclohexanol 1 part or, (Example 3) a mixture of tetrahydronaphthalene and decahydronaphthalene 1 part, ethylene chlorhydrin 1 part and propylene chlorhydrin 1 part or, (Example 4) hexahydronaphthalene 1 part and acetone 1 part; this producing a very easily inflammable composition, or, (Example 5) hexahydronaphthalene 10 parts, ethyl alcohol 5 parts, carbon tetrachloride 3 parts or, (Example 6) tetrahydronaphthalene 4 parts, chlorbenzol 1 part, acetylene-tetrachloride 1 part and amyl acetate 2 parts.

The parts by weight are volumetric. To each of the foregoing mixtures a quantity of paraffin wax is preferably added, ordinarily 2 to 5%, this may be accomplished for example by melting the wax and adding it with stirring to the mixture of solvents.

In making up a composition such as described above it should be borne in mind that the hydronaphthalenes are not as readily miscible with alcoholic solvents as with hydrocarbon solvents and to secure an effective solvent action on coatings which contain spirit soluble varnishes it is usually highly desirable to have a complete blending or miscibility of the solvents as otherwise the action is irregular. Alcoholic bodies which do not mix readily with the hydronaphthalenes may sometimes be made to blend by the addition of a third solvent in which both of the other solvents are miscible. For example benzol is a useful blending agent.

What I claim is:—

1. A paint and varnish remover comprising wax, tetrahydronaphthalene and an alcoholic body miscible with the tetrahydronaphthalene.

2. A paint and varnish remover comprising wax, tetrahydronaphthalene and cyclohexanol.

3. A paint and varnish remover comprising hydronaphthalene, an alcoholic solvent miscible therewith and a few per cent of wax.

4. A paint and varnish remover having low inflammability and high flashpoint comprising tetrahydronaphthalene and benzyl alcohol.

5. A paint and varnish remover of low inflammability and high flashpoint comprising tetrahydronaphthalene and chlorhydrin.

CARLETON ELLIS.